(12) United States Patent
Morii

(10) Patent No.: US 11,237,773 B2
(45) Date of Patent: Feb. 1, 2022

(54) PRINTING APPARATUS TO DISPLAY USER SELECTION SCREEN, CONTROL METHOD FOR PRINTING APPARATUS, AND STORAGE MEDIUM

(71) Applicant: CANON KABUSHIKI KAISHA, Tokyo (JP)

(72) Inventor: Hiroyuki Morii, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/383,271

(22) Filed: Apr. 12, 2019

(65) Prior Publication Data

US 2019/0238695 A1 Aug. 1, 2019

Related U.S. Application Data

(63) Continuation of application No. 15/205,582, filed on Jul. 8, 2016, now Pat. No. 10,313,541.

(30) Foreign Application Priority Data

Jul. 10, 2015 (JP) .................................. 2015-138896

(51) Int. Cl.
*G06F 3/12* (2006.01)
*H04N 1/00* (2006.01)

(52) U.S. Cl.
CPC .......... *G06F 3/1204* (2013.01); *G06F 3/1238* (2013.01); *H04N 1/00506* (2013.01); *H04N 1/00509* (2013.01); *H04N 1/00344* (2013.01); *H04N 1/00862* (2013.01)

(58) Field of Classification Search
CPC combination set(s) only.
See application file for complete search history.

(56) References Cited

U.S. PATENT DOCUMENTS

| 7,808,664 B2* | 10/2010 | Wang | .................... G06F 21/608 358/1.14 |
| 10,275,196 B2* | 4/2019 | Tomihisa | .............. G06F 3/1288 |
| 10,277,777 B2* | 4/2019 | Morii | ................. H04N 1/00411 |
| 10,599,374 B2* | 3/2020 | Tomihisa | ........... H04N 1/00034 |

(Continued)

FOREIGN PATENT DOCUMENTS

| JP | H09-319705 | * 12/1997 |
| JP | 2011-253274 | * 12/2012 |

*Primary Examiner* — Barbara D Reinier
(74) *Attorney, Agent, or Firm* — Canon U.S.A., Inc. IP Division

(57) ABSTRACT

A printing apparatus includes a login control unit, including a user table for registering users permitted to log into the printing apparatus, configured to display a login screen including a list of the users registered in the user table, and to permit, a user to log into the printing apparatus when selection of the user is received through the login screen, a printing control unit configured to execute processing for printing print data transmitted from an external apparatus and stored in a storage unit, based on a print start operation performed by the user permitted to log into the printing apparatus, and a management unit configured to manage owner information indicating an owner of the print data stored in the storage unit. The login control unit is configured to acquire the owner information from the management unit, and display the login screen based on the acquired owner information.

22 Claims, 15 Drawing Sheets

(56) References Cited

U.S. PATENT DOCUMENTS

| | | | |
|---|---|---|---|
| 2006/0248468 A1* | 11/2006 | Constantine | G06F 40/137 715/747 |
| 2012/0099127 A1* | 4/2012 | Nagata | H04N 1/0044 358/1.13 |
| 2015/0153986 A1* | 6/2015 | Lin | G06F 3/1267 358/1.15 |
| 2015/0324675 A1* | 11/2015 | Morii | H04N 1/4413 358/1.14 |
| 2016/0210094 A1* | 7/2016 | Nishikawa | H04N 1/00411 |

* cited by examiner

■ USER REGISTRATION SCREEN

| | | |
|---|---|---|
| USER NAME: | [         ] | 501 |
| PASSWORD | [         ] | 502 |
| CARD ID | [         ] | 503 |
| EMAIL ADDRESS: | [         ] | 504 |
| ICON | [         ] | 505 |

[CANCEL] 506  [OK] 507

■ USER EDIT SCREEN

| | | |
|---|---|---|
| USER NAME: | USER 1 | 501 |
| PASSWORD | * * * * * | 502 |
| CARD ID | [         ] | 503 |
| EMAIL ADDRESS: | user1@xxx.jp | 504 |
| ICON | icon1 | 505 |

[CANCEL] 506  [OK] 507

FIG.7

800 HELD DOCUMENT LIST SCREEN

| PERSONAL PRINT | | | | |
|---|---|---|---|---|
| User1 | | | | 801 |
| DOCUMENT NAME | NUMBER OF PAGES | NUMBER OF COPIES | TIME | |
| ☐ DOCUMENT 1.doc | 1 | 1 | 2015/06/09 15:52 | |
| ☐ DOCUMENT 2.pdf | 3 | 3 | 2015/06/09 20:37 | |
| | | | | |
| | | | | |
| | | | | |
| SELECT ALL | DELETE | | START PRINTING | |
| 802 | 803 | | 804 | |

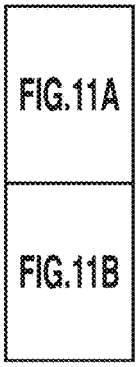
FIG.11A
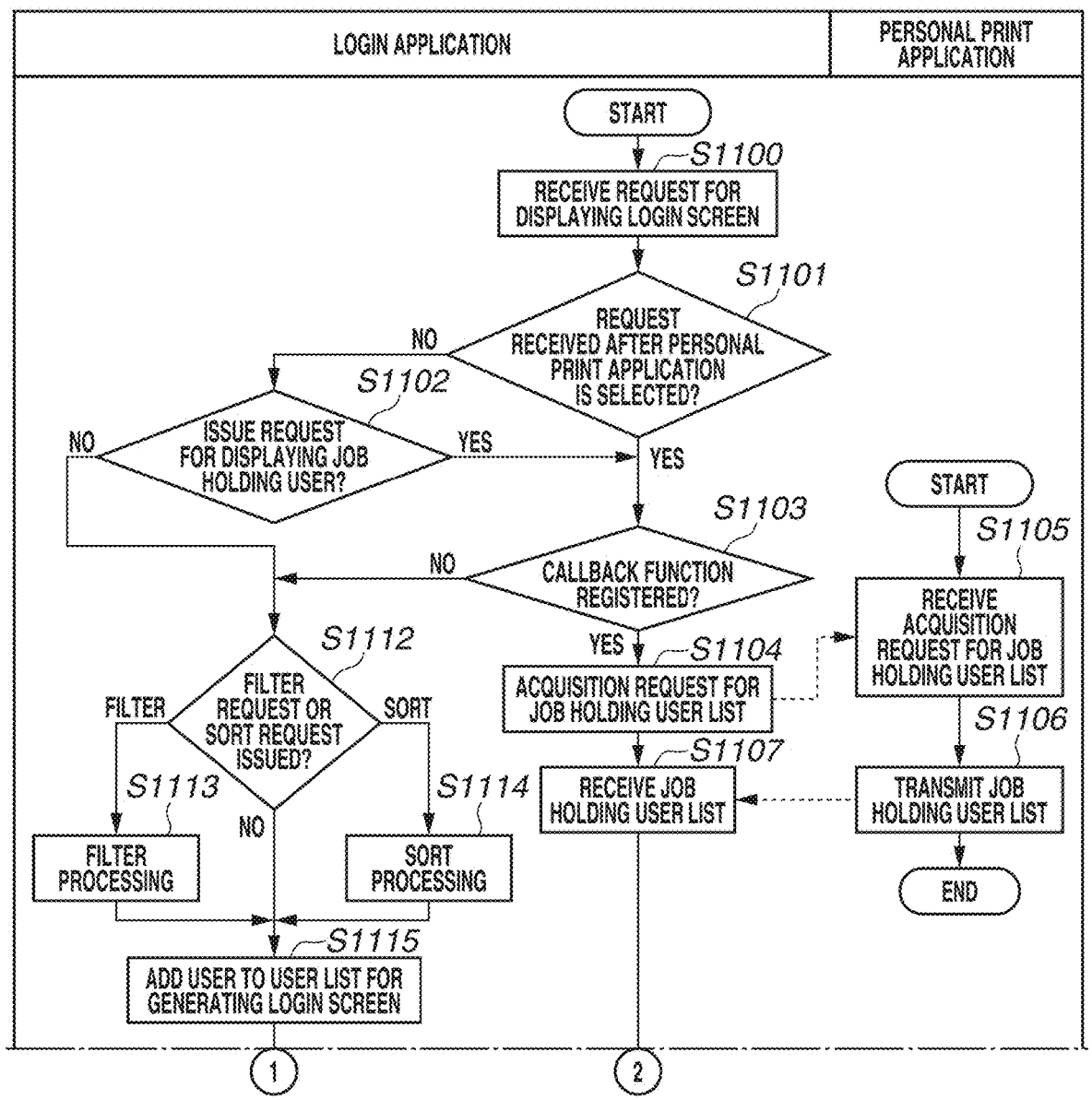

FIG.12

| HELD DOCUMENTS IN DESCENDING ORDER BASED ON RECEIVED DATES | USER NAME |
|---|---|
| 1 | User1 |
| 2 | User3 |
| 3 | User2 |
| 4 | User5 |

FIG.13

| DOCUMENT NAME | JOB OWNER NAME | RECEIVED DATE | PRINT SETTING |
|---|---|---|---|
| DOCUMENT 1.doc | User1 | 201506091552 | NUMBER OF PAGES: 1, COLOR, 1 in 1, 1 COPY |
| DOCUMENT 2.doc | User2 | 201506091309 | NUMBER OF PAGES: 4, MONOCHROME, 2 in 1, 2 COPIES |
| DOCUMENT 10.pdf | User5 | 201506091926 | NUMBER OF PAGES: 6, TWO-COLOR, 4 in 1, 3 COPIES |
| DOCUMENT 4.doc | User3 | 201506091432 | NUMBER OF PAGES: 8, COLOR, 2 in 1, 4 COPIES |
| DOCUMENT 3.xls | User3 | 201506091101 | NUMBER OF PAGES: 1, MONOCHROME, 2 in 1, 5 COPIES |
| DOCUMENT 6.doc | User2 | 201506090945 | NUMBER OF PAGES: 9, COLOR, 1 in 1, 4 COPIES |
| DOCUMENT 7.doc | User5 | 201506091614 | NUMBER OF PAGES: 6, MONOCHROME, 2 in 1, 2 COPIES |
| DOCUMENT 9.ppt | User3 | 201506091821 | NUMBER OF PAGES: 15, MONOCHROME, 4 in 1, 1 COPY |
| DOCUMENT 11.ppt | User2 | 201506091914 | NUMBER OF PAGES: 14, COLOR, 2 in 1, 5 COPIES |
| DOCUMENT 2.pdf | User1 | 201506092037 | NUMBER OF PAGES: 3, COLOR, 2 in 1, 3 COPIES |

FIG.14

| USER NAME 1401 | PASSWORD 1402 | CARD ID 1403 | EMAIL ADDRESS 1404 | GROUP ID 1405 | ICON IMAGE 1406 | AUTHORITY 1407 | LATEST LOGIN DATE 1408 | REGISTERED DATE 1409 |
|---|---|---|---|---|---|---|---|---|
| User1 | XXXX | User1 card | user1@xxx.jp | Group1 | icon1 | Administrator | 201506051500 | 20140305 |
| User2 | XXXX | User2 card | user2@xxx.jp | Group1 | icon2 | General User | 201506031500 | 20140605 |
| User3 | XXXX | User3 card | user3@xxx.jp | Group3 | icon3 | Power User | 201506011500 | 20140805 |
| User4 | XXXX | User4 card | user4@xxx.jp | Group5 | icon4 | Limited User | 201506061500 | 20141005 |
| User5 | XXXX | User5 card | user5@xxx.jp | Group2 | icon5 | General User | 201506071500 | 20141205 |
| User6 | XXXX | User6 card | user6@xxx.jp | Group2 | icon6 | General User | 201506081500 | 20150305 |

PRINTING APPARATUS TO DISPLAY USER SELECTION SCREEN, CONTROL METHOD FOR PRINTING APPARATUS, AND STORAGE MEDIUM

The present application is a continuation of U.S. patent application Ser. No. 15/205,582, filed Jul. 8, 2016, the content of which is expressly incorporated by reference herein in its entirety. Further, the present application claims priority from Japanese Patent Application No. 2015-138896, filed Jul. 10, 2015, which is also hereby incorporated by reference herein in its entirety.

BACKGROUND OF THE INVENTION

Field of the Invention

The present invention relates to a printing apparatus that receives and prints print data transmitted from an external apparatus.

Description of the Related Art

Recent introduction of a multi-function peripheral (hereinafter, referred to as an MFP) in a large office has increased a risk of information leakage from a printed product left in the MFP. More specifically, since many office workers now use the MFP to output printing products, there is a risk of exposing confidential information printed on a printed product output by one office worker to another office worker who should not have access to such information.

For that reason, an MFP employs a printing system known as hold printing to prevent such information leakage. In the hold printing, a document transmitted from an external apparatus such as a personal computer (PC) is not immediately printed when the document is received, but accumulated on a hard disk in the MFP as a held document. The printing is executed only when the user who has instructed the printing of a document with his or her PC goes to a place where the MFP is installed and executes a print start operation with a touch panel on the MFP. The hold printing described above can not only prevent such information leakage from the printed product mistakenly picked up or left in the MFP, but can also reduce unnecessary printing and the number of document sheets left in the MFP.

However, when documents of many users are accumulated on the hard disk in the MFP, a user has to find a document that the user has input from a great number of documents including those input by other users to execute a print start operation for the desired document. As a method for addressing this, Japanese Patent Application Laid-Open No. 2012-254618 discusses a method with which a user can easily find his or her document from the held documents. In Japanese Patent Application Laid-Open No. 2012-254618, a print data control unit of an MFP extracts user identification information from a received document, and manages the information. When a hold printing function is selected, the print data control unit displays a list of the user identification information on an operation unit of the MFP, so that the user can select his or her user identification information from the list. Then, only documents corresponding to the selected user identification information are displayed. The method frees the user from finding the document that the user has input from the great number of documents including those input by other users.

As another widely known technique, MFP login permission is given based on user authentication. Examples of such technique include a keyboard authentication method using a user name/password to be input from a touch panel, and an integrated circuit (IC) card authentication method using card information acquired from an IC card through a contactless IC card reader. In either of the authentication methods, verification of the identity of a user is performed using authentication information input by the user through a certain operation. These methods generally involve a login application (or authentication application) including a user table required for matching with authentication information input by the user.

Furthermore, a proposed login method involving no user authentication includes a method in which a login application (authentication application) displays a list of user identification information, registered in the user table, on a login screen on a touch panel. With this method, the user can easily log in by simply selecting his or her user identification information on the displayed login screen. In this login method, the user is permitted to log into the MFP without an input of personal information such as a password or card information. In other words, the method involves no strict user authentication, and is inferior to a conventional authentication method in terms of security, but has an advantage in that a login user can be identified through a simple operation. Accordingly, the login method is effective in a case where a user logs into the MFP only through an operation of selecting the user identification information, and a customized function (also referred to as a personalized function) of the MFP corresponding to the login user is provided.

Here, a description is given on how the login application displays the list of the user identification information on the login screen in the login method based on the selection of the user identification information described above.

For example, in some cases, user identification information of a user who has instructed document input with a PC (hereinafter, referred to as "document input user") is desirably displayed on the login screen with a priority over other users. For example, it is assumed that the login application may be managing information about a great number of users including only a few document input users. Since the few document input users have instructed document input through PCs, the document input users are likely to soon log into the MFP to perform a print start operation for their documents. The user can more easily select his or her user identification information when only the identification information of such users is displayed on the login screen. In some cases, the user can more easily select his or her user identification when the documents are displayed after sorted by their received date and time.

SUMMARY OF THE INVENTION

The present invention is directed to a method for appropriately displaying user identification information on a login screen.

According to an aspect of the present invention, a printing apparatus includes a login control unit, including a user table for registering users permitted to log into the printing apparatus, configured to display a login screen including a list of the users registered in the user table, and to permit a user to log into the printing apparatus when selection of the user is received through the login screen, a printing control unit configured to execute processing for printing print data transmitted from an external apparatus and stored in a storage unit, based on a print start operation performed by the user permitted to log into the printing apparatus, and a management unit configured to manage owner information indicating an owner of the print data stored in the storage unit. The login control unit is configured to acquire the owner information from the management unit, and display the login screen based on the acquired owner information.

Further features of the present invention will become apparent from the following description of exemplary embodiments with reference to the attached drawings.

BRIEF DESCRIPTION OF THE DRAWINGS

FIGS. 5A and 5B are diagrams each illustrating an example of a screen for registering or editing a user account.

FIG. 7 is a diagram illustrating an example of a screen displaying a list of held documents.

FIG. 12 is a diagram illustrating an example of a list of document holding users, managed by a personal print application.

FIG. 13 is a diagram illustrating an example of bibliographic information of held documents, managed by the personal print application.

FIG. 14 is a diagram illustrating an example of a user list in a user table, managed by a login application.

DESCRIPTION OF THE EMBODIMENTS

Exemplary embodiments of the present invention will be described in detail below with reference to drawings. The exemplary embodiments do not limit the scope of the invention according to the appended claims, and not all the combinations of features described in the exemplary embodiments are required for the solution provided by the present invention.

A first exemplary embodiment according to the present invention is described.

<System Configuration>

Figure 1:
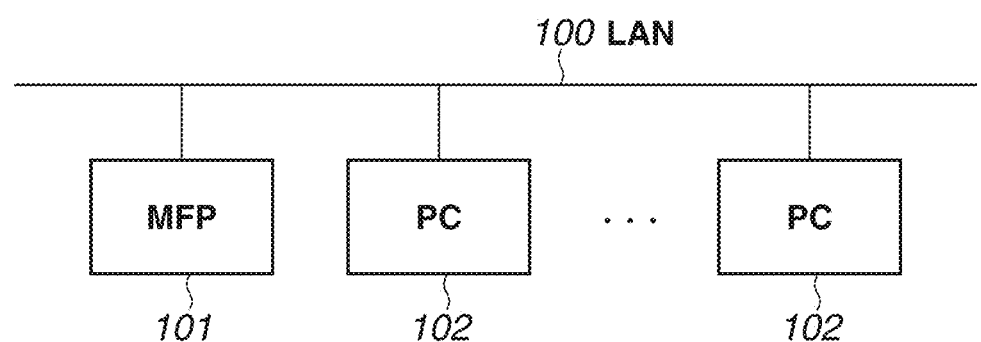
FIG. 1 is a diagram illustrating a system configuration.

An example of a system configuration to which the present exemplary embodiment can be applied is described with reference to FIG. 1. In a system illustrated in FIG. 1, a multi-function peripheral (MFP) 101 and personal computers (PC) 102 are communicably connected via a local area network (LAN) 100. The PCs 102 each have a function of generating print data written in a page description language through a printer driver and transmitting the print data to the MFP 101. The MFP 101 has a printing function of receiving and printing the print data transmitted from the PC 102. The PC 102 is an example of an external apparatus, and the MFP 101 is an example of a printing apparatus.

The MFP 101 has a hold printing function to prevent information leakage from a print document left in the MFP 101. The hold printing function is a function with which print data transmitted from the PC 102 is not immediately printed at the point of reception, but is accumulated on a hard disk in the MFP 101 as a held document. Accordingly, after the user instructs printing of a document with a PC, the printing is executed only when the user goes to a place where the MFP 101 is installed and executes a printing start operation through an operation unit on the MFP 101. The hold printing function can not only prevent information leakage from a printed product mistakenly picked up or left in the MFP 101, but can also reduce unnecessary printing and document sheets left in the MFP 101.

<Hardware Configuration>

Figure 2:
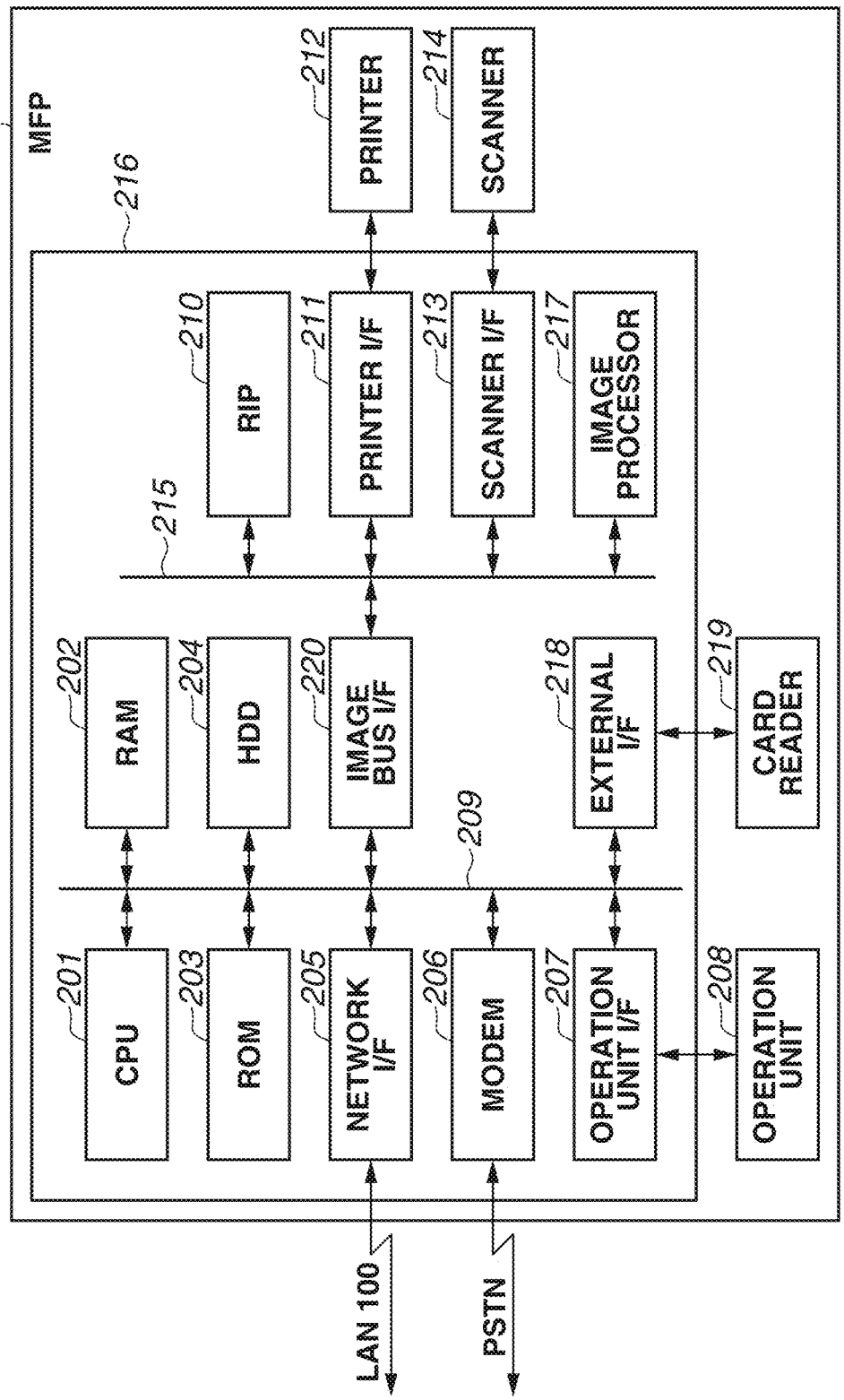
FIG. 2 is a diagram illustrating a hardware configuration of a multi-function peripheral (MFP).

FIG. 2 is a diagram illustrating a hardware configuration of the MFP 101. The MFP 101 includes a controller unit 216, a printer unit 212, a scanner unit 214, an operation unit 208, and a card reader 219. The controller unit 216 is connected to the LAN 100 and a public line (e.g., Public Switched Telephone Network (PSTN) or Integrated Services Digital Network (ISDN)), and receives and outputs image data and device information.

The printer unit 212 prints raster image data on a sheet through electrophotography using a photosensitive drum and a photosensitive belt, or inkjet printing in which an image is directly printed on the sheet with ink discharged from a micro nozzle array. The printer unit 212 starts printing processing under an instruction from a central processing unit (CPU) 201. The printer unit 212 includes a plurality of sheet feeding stages so that different sheet sizes and different sheet orientations can be selected. The printer unit 212 further has a finishing function and the finishing mechanism is referred to as a finisher and the like, as an additional function. The finishing mechanism includes a mechanism that sorts printed products into sets of copies, staples the printed products, and folds the printed products.

The scanner unit 214 is a device that irradiates an image on a sheet of document with light, and scans the image with a charge-coupled device (CCD) line sensor, so that the image is converted into an electrical signal as raster image data. The scanner unit 214 performs an operation of reading the sheet of document under the control performed by the CPU 201, in response to a reading start instruction from the user issued through the operation unit 208.

The operation unit 208 includes a liquid crystal display (LCD) on which a touch panel sheet is attached, and displays an operation screen. When a key on the displayed screen is pressed (touched with a finger), the operation unit 208 informs the CPU 201 of information about the pressed position through an operation unit interface 207. The operation unit 208 includes various operation keys (hardware keys) examples of which include a start key, a stop key, an identification (ID) key, and a reset key.

The card reader 219 is a device that acquires card information from a contactless IC card. The card reader 219 reads the card information stored in the IC card under the control performed by the CPU 201, and notifies the CPU 201 of the read card information, through an external interface 218 in the controller unit 216. Examples of the IC card include FeliCa (conforming to ISO/IEC 15408) (registered trademark) from Sony Corporation and MIFARE (conforming to ISO/IEC 14443) (registered trademark) from NXP Semiconductors N.V.

The controller unit 216 is a device that controls the MFP 101. The controller unit 216 includes the CPU 201, a random access memory (RAM) 202, a read only memory (ROM) 203, a hard disk drive (HDD) 204, a network interface 205, a modem 206, the operation unit interface 207, an image bus interface 220, and the external interface 218 that are connected to a system bus 209. The controller unit 216 includes a raster image processor 210, a printer interface 211, a scanner interface 213, and an image processor 217 that are connected to an image bus 215 that transfers image data at a high speed.

The CPU 201 is a processor that controls the MFP 101. The RAM 202 is a system network memory for the CPU 201 operating, and also serves as a program memory for storing a program and an image memory for temporarily storing image data. The ROM 203 stores an activation program and various control programs for the system. The HDD 204 stores various programs for controlling the system, image data, user information for user authentication/identification, and the like.

The operation unit interface 207 is an interface unit for the operation unit 208, and outputs data to be displayed to the operation unit 208. The operation unit interface 207 transmits information, input from the user through the operation unit 208, to the CPU 201.

The network interface 205 is connected to the LAN 100, and outputs and receives data to and from the PCs 102 and another external apparatus. The modem 206 is connected to a public line such as PSTN, and performs data input/output such as FAX transmission/reception.

The external interface 218 receives an external input from a universal serial bus (USB), an IEEE 1394 compliant bus, a printer port, recommended standard (RS)-232C based serial port, and the like. In the present exemplary embodiment, the card reader 219 is connected to the external interface 218. Through the external interface 218, the CPU 201 can control reading of information from an IC card by the card reader 219 and can obtain the information read from the IC card.

The image bus interface 220 is a bus bridge which connects the system bus 209 with the image bus 215 and converts a data structure. The image bus 215 is a peripheral component interconnect (PCI) bus or an IEEE 1394 compliant bus. The raster image processor 210 rasterizes print data into a bit map image. The printer interface 211 connects the printer unit 212 with the controller unit 216, and performs synchronous/asynchronous conversion on image data. The scanner interface 213 connects the scanner unit 214 with the controller unit 216, and performs synchronous/asynchronous conversion on image data. The image processor 217, for example, corrects, processes, and edits input image data to perform correction, resolution conversion, and the like on the printer, for print output image data. The image processor 217 rotates image data, and executes compression/decompression processing using Joint Photographic Experts Group (JPEG) for multivalued image data and Joint Bi-level Image Experts Group (JBIG), Modified Modified READ (MMR), Modified Huffman (MH), and the like for bi-level image data.

The MFP 101 with the configuration described above can accumulate print data transmitted from the PC 102 through the LAN 100 as a held document, and print out the document in response to a print start instruction from the user.

<Software Configuration>

Figure 3:
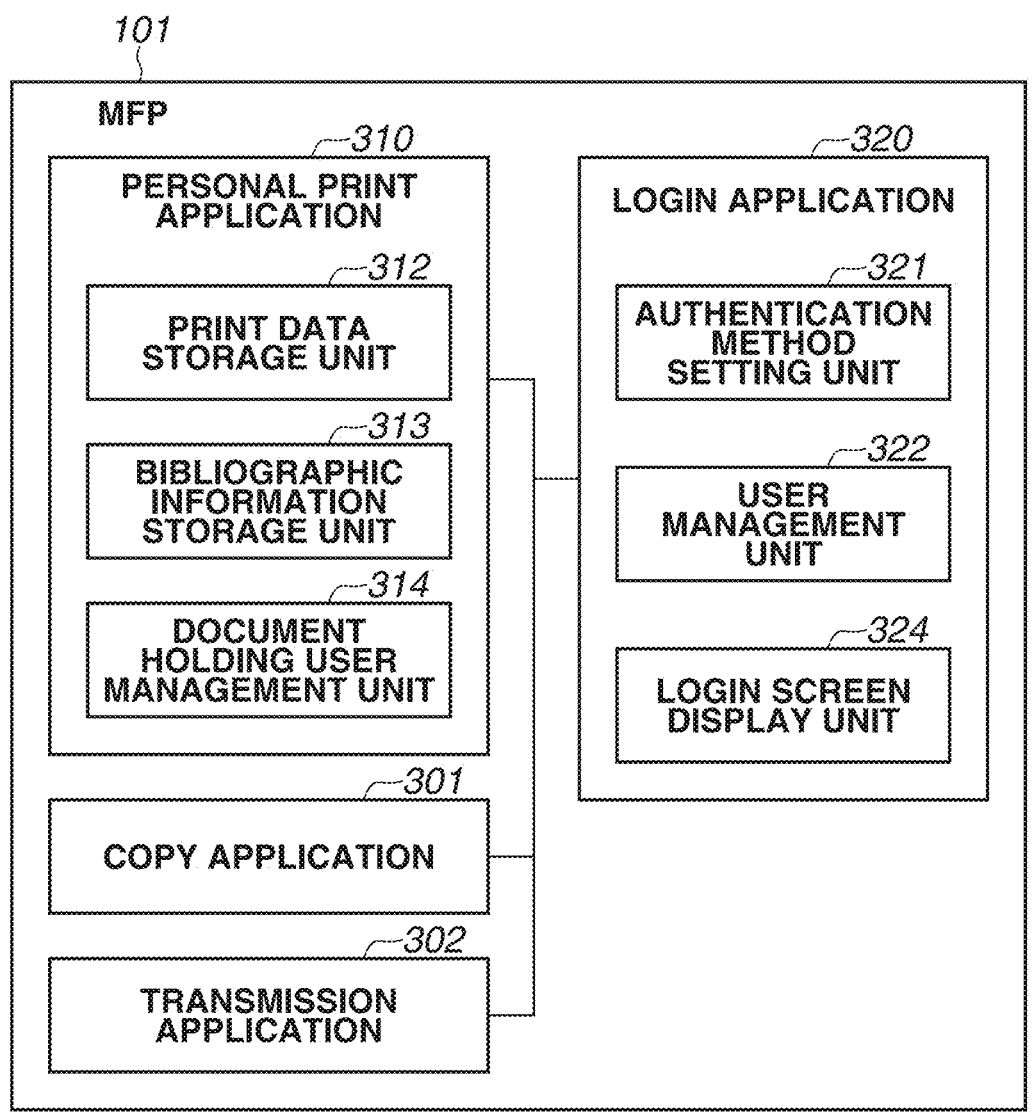
FIG. 3 is a diagram illustrating a software configuration of the MFP.

FIG. 3 is a block diagram illustrating a software configuration of the MFP 101. The MFP 101 includes a copy application 301, a transmission application 302, and a personal print application 310.

The copy application 301 is an application for controlling the scanner unit 214 and the printer unit 212 to execute copying. The transmission application 302 is an application for controlling the scanner unit 214, the network interface 205, and the modem 206 to transmit an image of a scanned document to an external apparatus by email, FAX, and the like. The personal print application 310 is an application for accumulating print data, transmitted from the PC 102, in the HDD 204 as a held document, displaying a list of held documents of logged in users, and executing processing for printing a document selected from the list. A login application 320 is an application for executing processing related to user authentication and login.

In the present exemplary embodiment, two especially important applications are described in detail. The two applications are the personal print application 310, which is an example of a print control unit, and the login application 320, which is an example of a login control unit.

First of all, the personal print application 310 will be described. The personal print application 310 includes a print data storage unit 312, a bibliographic information storage unit 313, and a document holding user management unit 314. The print data storage unit 312 performs control so that a document transmitted from the PC 102 is stored in the HDD 204. The bibliographic information storage unit 313 performs control so that print settings and an owner name (owner information), described in the print data transmitted from the PC 102, are extracted and stored in the HDD 204 as bibliographic information illustrated in FIG. 13. The document holding user management unit 314 manages the owner name, extracted from the print data transmitted from the PC 102, as information for identifying a user for which a held document is held (hereinafter, referred to as document holding user information). As illustrated in FIG. 12, pieces of the document holding user information are managed in a state where pieces of the document holding user information are sorted in a reverse chronological order (descending order) of the received date and time of the print data. The document holding user information is deleted in response to the deletion of the print data caused by completion of the printing or a deletion instruction from the user.

Here, it is especially important that the document holding user information is managed not by the login application 320, but by the personal print application 310. The document holding user information is dynamic information that is frequently updated by input and deletion of documents. If such dynamic information is managed by the login application 320, the personal print application 310 needs to frequently issue an update notification to the login application 320. Thus, the present exemplary embodiment employs the configuration where the personal print application 310 manages the document holding user information.

Next, the login application 320 will be described. The login application 320 includes an authentication method setting unit 321, a user management unit 322, and a login screen display unit 324. The authentication method setting unit 321 sets an authentication method. In the present exemplary embodiment, three authentication methods are described, namely, a card authentication method, a keyboard authentication method, and an icon selection method. In the card authentication method, an integrated circuit (IC) card is used. In the keyboard authentication method, a user name and a password to be input by the user through a keyboard of the operation unit 208 are used. In the icon selection method, login is permitted through selection of a user icon displayed on an icon selection screen. A biometric authentication method, in which an individual is identified based on a human physical feature such as vein, is another available authentication method but will not be described herein. The icon selection method is especially important in the present exemplary embodiment.

In the icon selection method, the login application 320 displays a list of user names, registered in a user table, and icon images corresponding to respective user names, on the login screen of the operation unit 208. In this method, the user can easily log in by simply selecting icon corresponding to the user on the login screen. In the login method, the user is permitted to log into the MFP 101 without inputting a password or personal information such as card information. In other words, the method involves no strict user authentication, and is inferior to the card authentication method and the keyboard authentication method in terms of security. On the other hand, the method is advantageous in that the login user can be identified through the simple operation. Accordingly, the method is effective in a case where the user logs in only through the operation of selecting the user name (icon corresponding to the user name), and a customized function (also referred to as a personalized function) of the MFP 101 according to the login user is provided thereto.

The authentication method setting unit 321 can also set a mode of operating the MFP 101. The mode is either "a mode of requesting the user authentication when the MFP is used" or "a mode of requesting the user authentication when an application is selected (function dependent authentication mode)".

The user management unit 322 manages user identification information about the user who is permitted to log into the MFP 101. The user management unit 322 manages user accounts, registered in the user table illustrated in FIG. 14, including a user name 1401, a password 1402, a card ID 1403, an email address 1404, a group ID 1405, an icon image 1406, a latest login date and time 1407, and a registered date and time 1408.

Figure 4A:
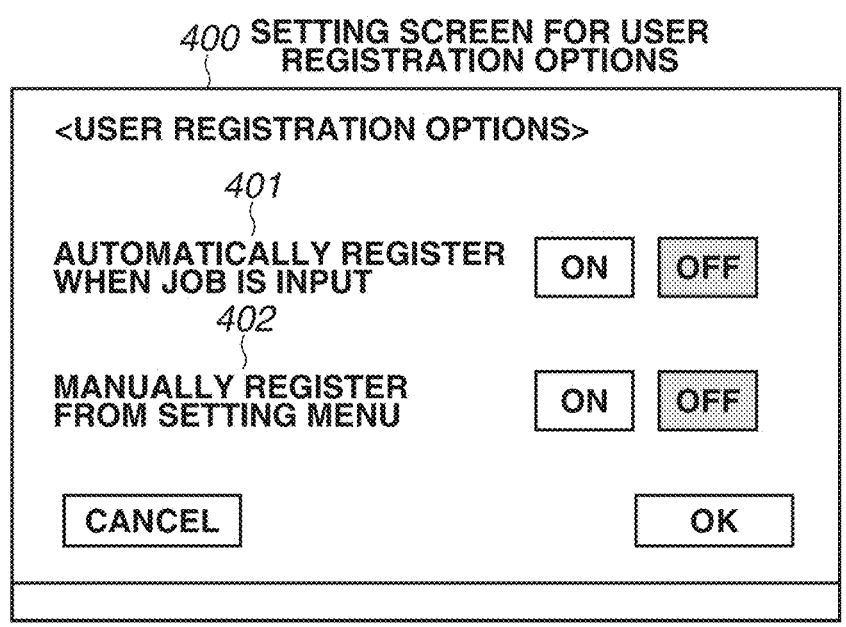
FIGS. 4A, 4B, and 4C are diagrams each illustrating an example of a login screen.

In the present exemplary embodiment, the user accounts may be registered by a dedicated system administrator in advance or registered by each user through a registration option illustrated in FIG. 4A.

FIG. 4A is a user interface (UI) screen, displayed on the operation unit 208 by the CPU 201, for setting a user account registration option. As illustrated in a setting screen 400 in FIG. 4A, the user registration option includes a first registration method 401 in which "the user account is automatically registered when a job is input" and a second registration method 402 in which "the user account is manually registered from a setting menu".

The first registration method 401 is a method in which reception of print data triggers registration of the owner name (owner information) included in the print data, in the user table illustrated in FIG. 14. When the first registration method 401 is enabled (ON) and print data is received, the owner of the print data is automatically added as the user account, which is not deleted in response to the deletion of the print data from the MFP 101.

In the second registration method 402, each user manually registers user identification information with a user registration button on the login screen 410.

The dedicated system administrator sets whether each of the two registration methods is available or unavailable through the screen illustrated in FIG. 4A.

The login screen display unit 324 performs login screen display control. For example, when the authentication method setting unit 321 has set the card authentication method, an authentication screen including a message such as "place your IC card over the card reader" is displayed. For example, when the keyboard authentication method has been set, an authentication screen including a message such as "input your user name and password" is displayed. When the icon selection method has been set as the authentication method, a login screen illustrated in FIG. 4B or FIG. 4C (described below) is displayed on the operation unit 208.

The software configuration of the MFP 101 has been described above. In the present exemplary embodiment, the personal print application 310 manages the document holding user information, whereas the login application 320 manages the user accounts. The login application 320 obtains the document holding user information from the personal print application 310 when the login screen is displayed. Based on the obtained document holding user information, the login application 320 can display only a document holding user icon, display user icons giving high priority to the document holding user icons, or display the user icons having been subjected to sorting in a reverse chronological order or an ascending order of the received date and time of the print data.

<Example of User Icon Selection Screen>

Figure 4B:
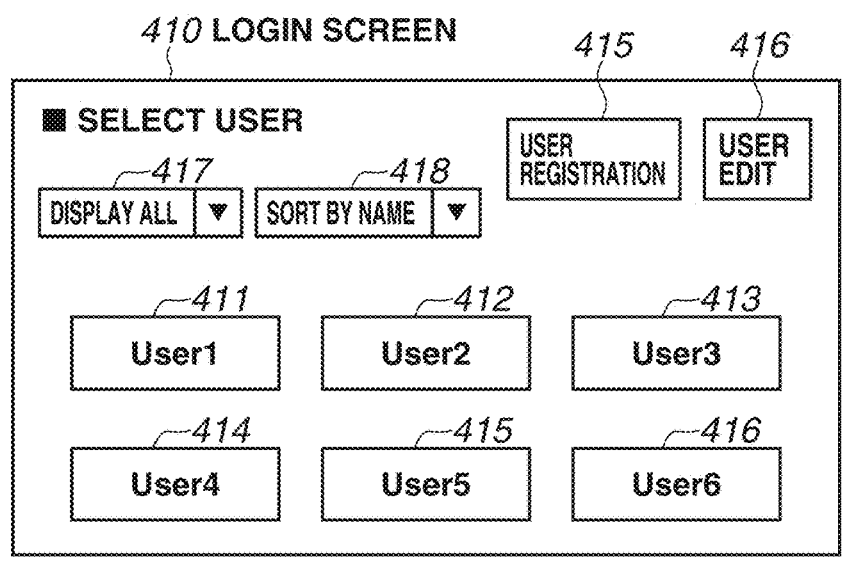

A UI screen displayed on the operation unit 208 by the login screen display unit 324 when the icon selection method has been set is described with reference to FIG. 4B. The login screen 410 is displayed when a predetermined condition is satisfied. More specifically, the login screen 410 is displayed immediately after the MFP 101 is activated or a user logs out when "the mode in which the user authentication is requested when the MFP is used" has been set by the authentication method setting unit 321. Meanwhile, the login screen 410 is displayed when an application is selected on an application selection screen 600 (described below), in a case where "a mode in which the authentication is requested when an application is selected (function dependent authentication mode)". In other words, the login screen 410 is displayed at a timing corresponding to the setting established by the authentication method setting unit 321.

User icons 411 to 416 are each an icon for identifying the user who is permitted to log into the MFP 101. The user can easily log in by selecting a corresponding one of the displayed user icons 411 to 416. In the present exemplary embodiment, up to six user icons can be displayed on a single screen. When icons corresponding to all the users cannot be displayed on a single screen, a flick operation may be performed so that the screen changes to display a subsequent set of user icons.

A user registration button 415 is a button used for newly registering a user account. The user registration button 415 is displayed only when the second registration method 402 is set to be enabled (ON) in FIG. 4A. When the user registration button 415 is pressed, the screen transitions to a user registration screen 500 illustrated in FIG. 5A, where a user name 501, a password 502, a card ID 503, an email address 504, and an icon 505 can be registered. When this registration operation is completed, a user account is newly added to the user table illustrated in FIG. 14. The user name 501 is an example of identification information for identifying a login permitted user. The user name 501 is a required item, whereas the password 502, the card ID 503, the email address 504, and the icon 505 are optional items.

A user edit button 416 is a button used for editing a user account that has been registered. When the user edit button 416 is pressed, the screen transitions to a user edit screen 510 illustrated in FIG. 5B, where the items other than the user name 501, namely, the password 502, the card ID 503, the email address 504, and the icon 505 can be added or edited.

Figure 4C:
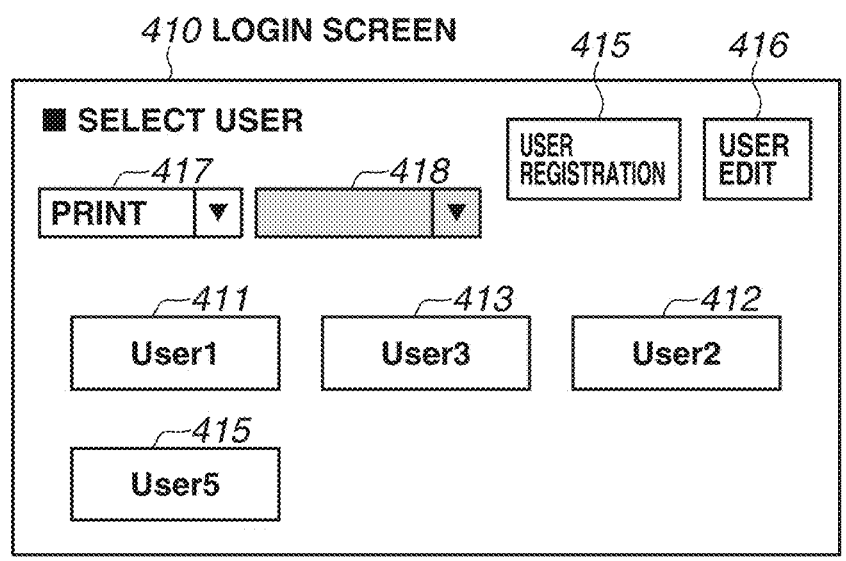

A user filter designation pull-down list 417 is used for filtering user icons to be displayed. When "display all" is selected with the user filter designation pull-down list 417, all the user names registered in the user table illustrated in FIG. 14 are displayed together with their icon images. When "print" is selected with the user filter designation pull-down list 417, only icon images corresponding to the document holding users among the users registered in the user table are displayed as illustrated in FIG. 4C. In the present exemplary embodiment, six Users 1 to 6 are registered in the user table, and only User 1, User 2, User 3, and User 5 among Users 1 to 6 are document holding users. Accordingly, only information about these document holding users is displayed as a result of the filtering. In FIG. 4C, User 1, User 2, User 3, and User 5 are sorted by their received date to be displayed.

A sort pull-down list 418 is used for sorting the user icons to be displayed. When "sort by name" is selected with the sort pull-down list 418, the user name icons are sorted in order of user names registered in the user table to be displayed.

<Example of Application Selection Screen>

Figure 6:
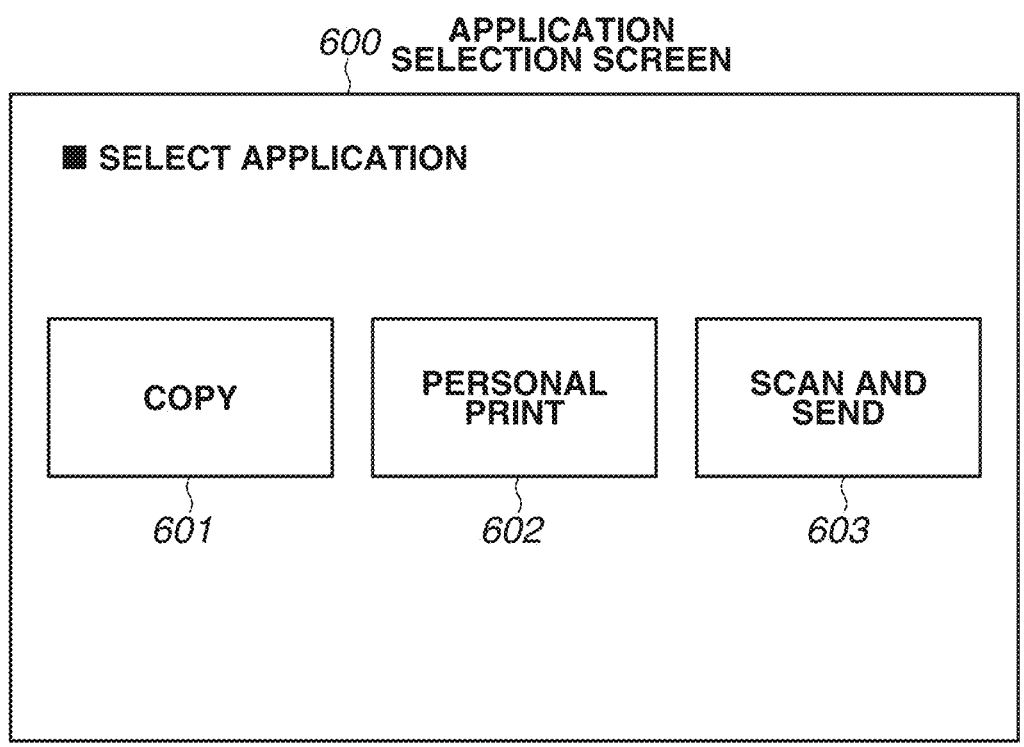
FIG. 6 is a diagram illustrating an example of an application selection screen.

FIG. 6 illustrates an application selection screen 600. The application selection screen 600 is displayed at a timing corresponding to the setting established by the authentication method setting unit 321 of the login application 320. In a case where "the mode in which the user authentication is requested when the MFP is used" has been set by the authentication method setting unit 321, the application selection screen 600 is displayed when the user icon 411 is selected on the login screen 410. On the other hand, when "the function dependent authentication mode" has been set, the application selection screen 600 is displayed immediately after the MFP 101 is activated or logout of a user. In other words, the application selection screen 600 is displayed at a timing corresponding to the setting established by the authentication method setting unit 321.

Buttons 601, 602, and 603 are displayed on the application selection screen 600, and respectively correspond to the copy application 301, the personal print application 310, and the transmission application 302.

<Example of Document List Screen>

When the button 602, corresponding to the personal print application 310, is pressed on the application selection screen 600, a held document list screen 800, illustrated in FIG. 7, is displayed.

In FIG. 7, only documents of the login user are displayed on the held document list screen 800, so that the user can easily find his or her document. In a held document list 801, print settings of the held document, the received date and time of the print data, and the like which are associated with User 1 as the login user and stored in the bibliographic information storage unit 313 are displayed. When the user instructs the printing of a held document, the user selects a desired document from the held document list displayed in the held document list 801, and presses a start printing button 804. When the user deletes a desired held document, the user can delete the held document from the print data management unit 311 by selecting the desired held document and pressing a delete button 803. The user can perform a desired operation with a held document selected one at a time, or with all the held documents selected by pressing a select all button 802.

<Operation at Activation>

Figure 9:
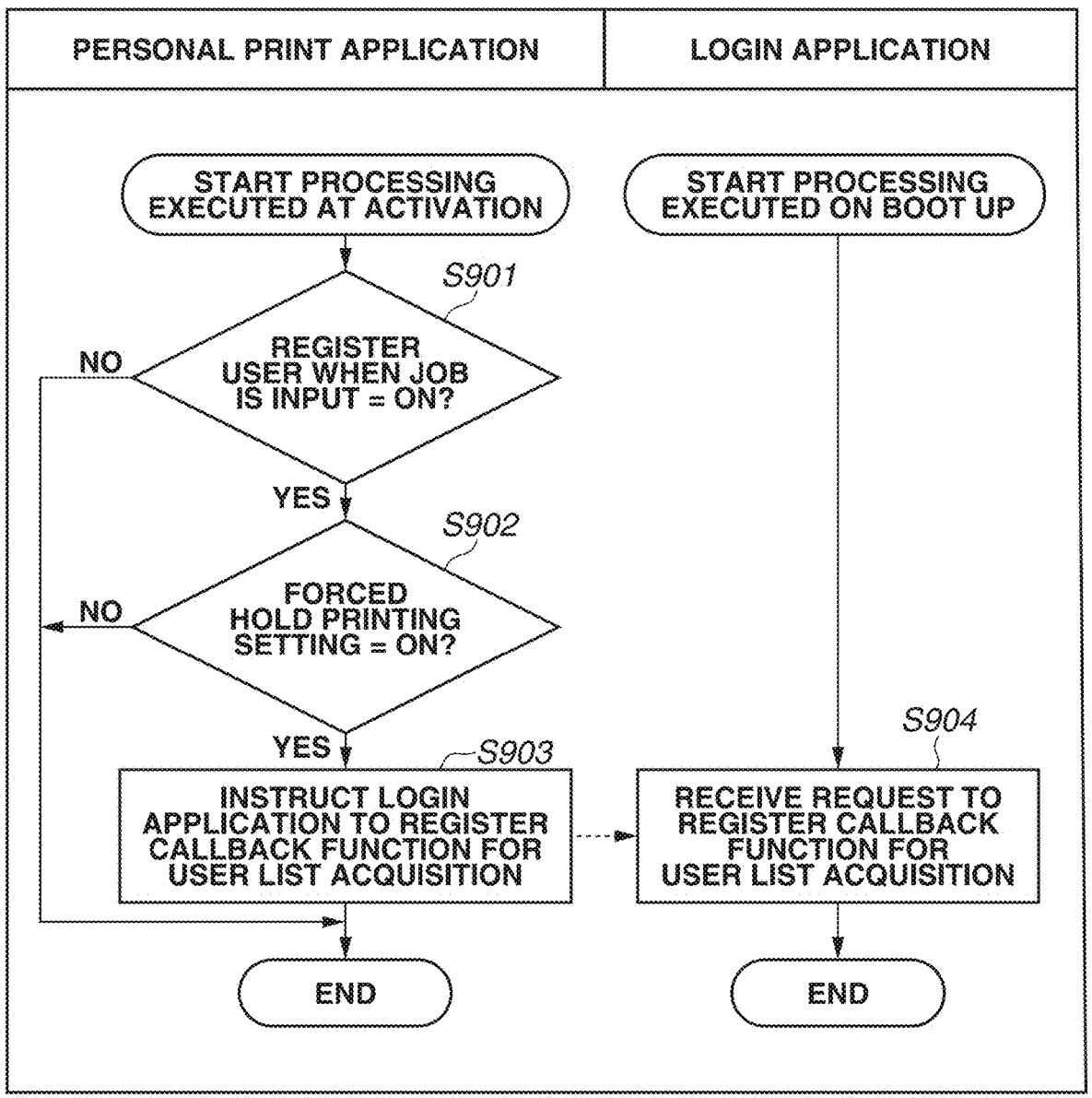
FIG. 9 is a flowchart illustrating processing in the MFP.

FIG. 9 is a flowchart illustrating processing, executed in activating, for registering a callback function for acquiring a list of users for which held documents are held. A program for executing each step in the flowchart illustrated in FIG. 9 is stored in the ROM 203 or the HDD 204, and is executed by the CPU 201.

First, in step S901, the personal print application 310 acquires the settings of the MFP 101 in activation processing, and determines whether the following two setting items are enabled (ON).

Figure 8:
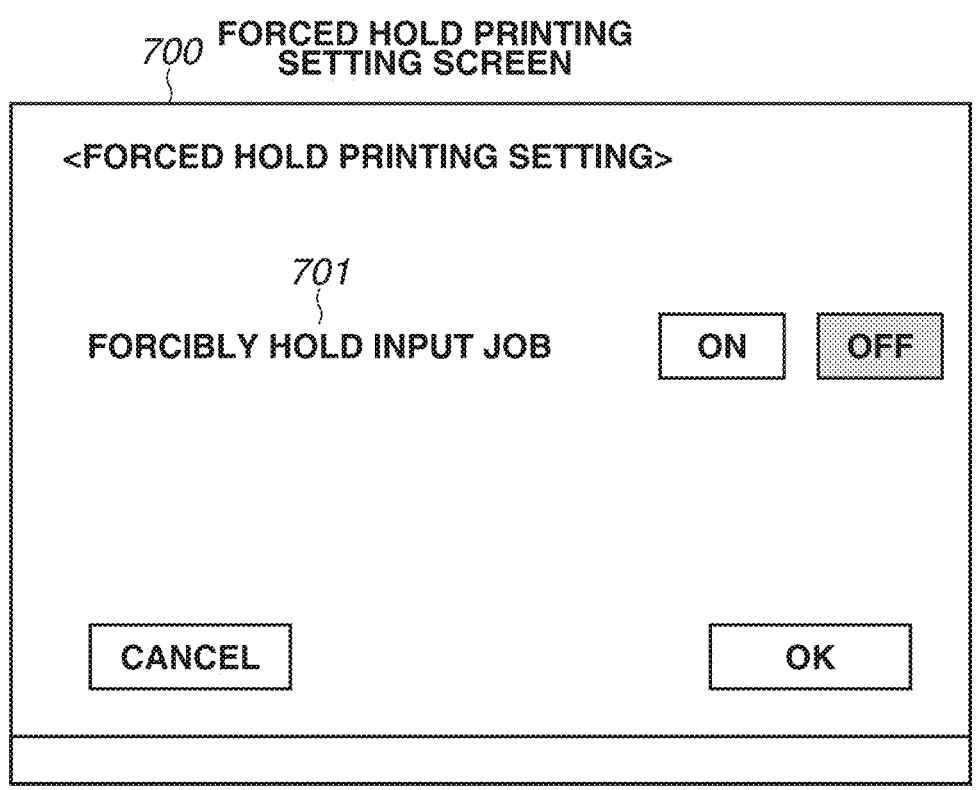
FIG. 8 is a diagram illustrating a screen for forced hold printing setting.

The first setting item is a setting for determining whether "a user account is automatically registered when a job is input" described with reference to FIG. 4A. The second setting item is a setting for determining whether "an input job is forcibly held" as illustrated in FIG. 8. These setting items are set by a dedicated system administrator in advance.

In step S901, when it is determined that the setting "a user account is automatically registered when a job is input" is ON (YES in step S901). The processing proceeds to step S902. In step S902, when it is determined that the setting "an input job is forcibly held" is ON (YES in step S902), the processing proceeds to step S903. On the other hand, the personal print application 310 terminates the processing in FIG. 9 when any one of the setting items is OFF (NO in step S901 or S902).

In step S903, the personal print application 310 instructs the login application 320 to register the call back function for acquiring the user list. In step S904, the login application 320 receives the request to register the call back function for acquiring the user list from the personal print application 310, and registers the call back function. The call back function is called by the login application 320 when the login processing is performed through the icon selection method.

<Processing in Receiving Print Data>

Figure 10:
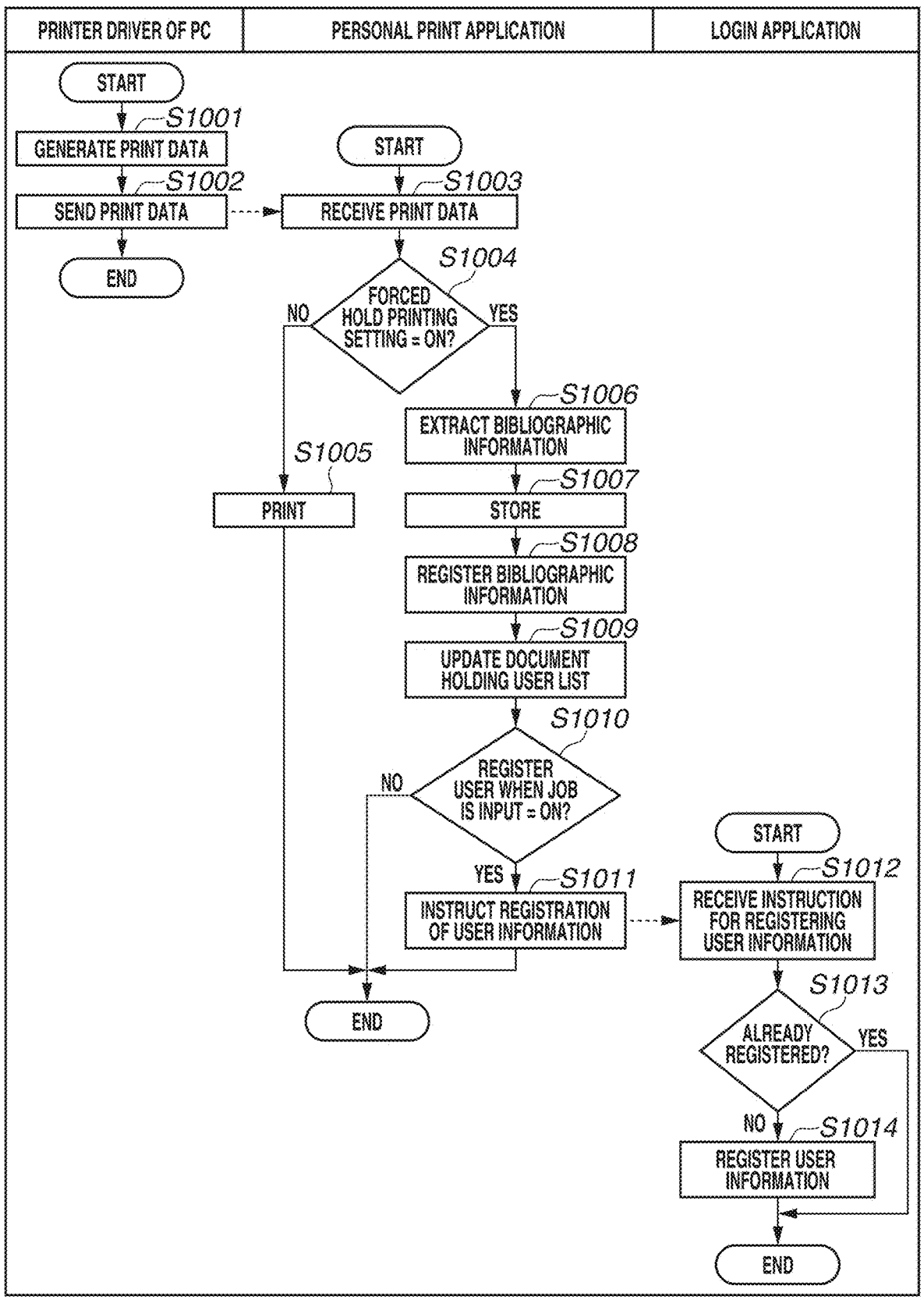
FIG. 10 is a flowchart illustrating processing in the MFP.

FIG. 10 is a flowchart illustrating processing executed when data transmitted from the PC 102 through the LAN 100 is accumulated or printed. The processing in steps S1001 and S1002 illustrated in the flowchart in FIG. 9 is executed by the PC 102. The processing in and after step S1003 is executed by the MFP 101. More specifically, a program for executing the processing in and after step S1003 is stored in the ROM 203 or the HDD 204 of the MFP 101 and is executed by the CPU 201.

In step S1001, the printer driver of the PC 102 is called when a print menu is displayed by the user on various applications, and displays a print setting screen. When a print instruction is received from the user through the print setting screen, the printer driver converts data in the application into data printable by the MFP 101 to generate print data. In step S1002, the printer driver transmits the print data generated in step S1001 to the MFP 101.

In step S1003, the personal print application 310, operating on the MFP 101, receives the print data transmitted from the printer driver of the PC 102 in step S1002. In step S1004, the personal print application 310 obtains the setting information about MFP 101 and checks whether the setting item "an input job is forcibly held" illustrated in FIG. 8 is enabled (ON). This setting item is set by the dedicated system administrator in advance. In step S1004, when the setting item is disabled (OFF) (NO in step S1004), the processing proceeds to step S1005, where the personal print application 310 executes print control. In this manner, the print data received is rasterized into bitmap image data by the raster image processor 210, and is output to the printer unit 212. The printer unit 212 performs printing on a sheet based on the output data.

In step S1004, when the setting item "an input job is forcibly held" is enabled (YES in step S1004), the processing proceeds to step S1006. In step S1006, the personal print application 310 acquires bibliographic information from the print data received in step S1003. The bibliographic information includes the owner name (owner information), a document name of the print data, the received date and time of the print data, the print setting information set by the user, and the like. In step S1007, the personal print application 310 stores the print data for which the bibliographic information is properly extracted in the HDD 204 of the MFP 101 as a held document. The print data to be stored in step S1007 may be stored as a page description language data or may be a bitmap image as a result of the rasterization by the raster image processor 210.

In step S1008, the personal print application 310 stores, in the HDD 204 of the MFP 101, the bibliographic information acquired in the step S1004 in association with the job owner name of the print data acquired from a header of the print data. In step S1009, the personal print application 310 adds the job owner name, acquired in step S1006, to the top of the document holding user list illustrated in FIG. 12. When the user with this job owner name has been already registered in the document holding user list, the user is moved to the top of the document holding user list. Through the processing executed in step S1009, the job holding user list is constantly managed in a state where the users are sorted by the received date and time.

In step S1010, the personal print application 310 acquires the settings of the MFP 101, and determines whether the setting item "a user account is automatically registered when a job is input" illustrated in FIG. 4A is ON. When it is determined that the setting item is ON (YES in step S1010), the processing proceeds to step S1011, where the personal print application 310 instructs the login application 320 to register the job owner name, acquired in step S1006, in the user table managed by the login application 320.

In step S1012, when the login application 320 receives the registration instruction from the personal print application 310, the processing proceeds to step S1013. In step S1013, the login application 320 determines whether the user name matching the received job owner name has been already registered in the user table. When such a user name has been already registered (YES in step S1013), the processing is terminated. When such a user name is not registered (NO in step S1013), the received job owner name is newly added to the user name 1401 as an item in the user table.

The MFP 101 performs operation in the aforementioned manner when receiving the print data.

<Processing Executed in Displaying Login Screen>

Figure 11B:
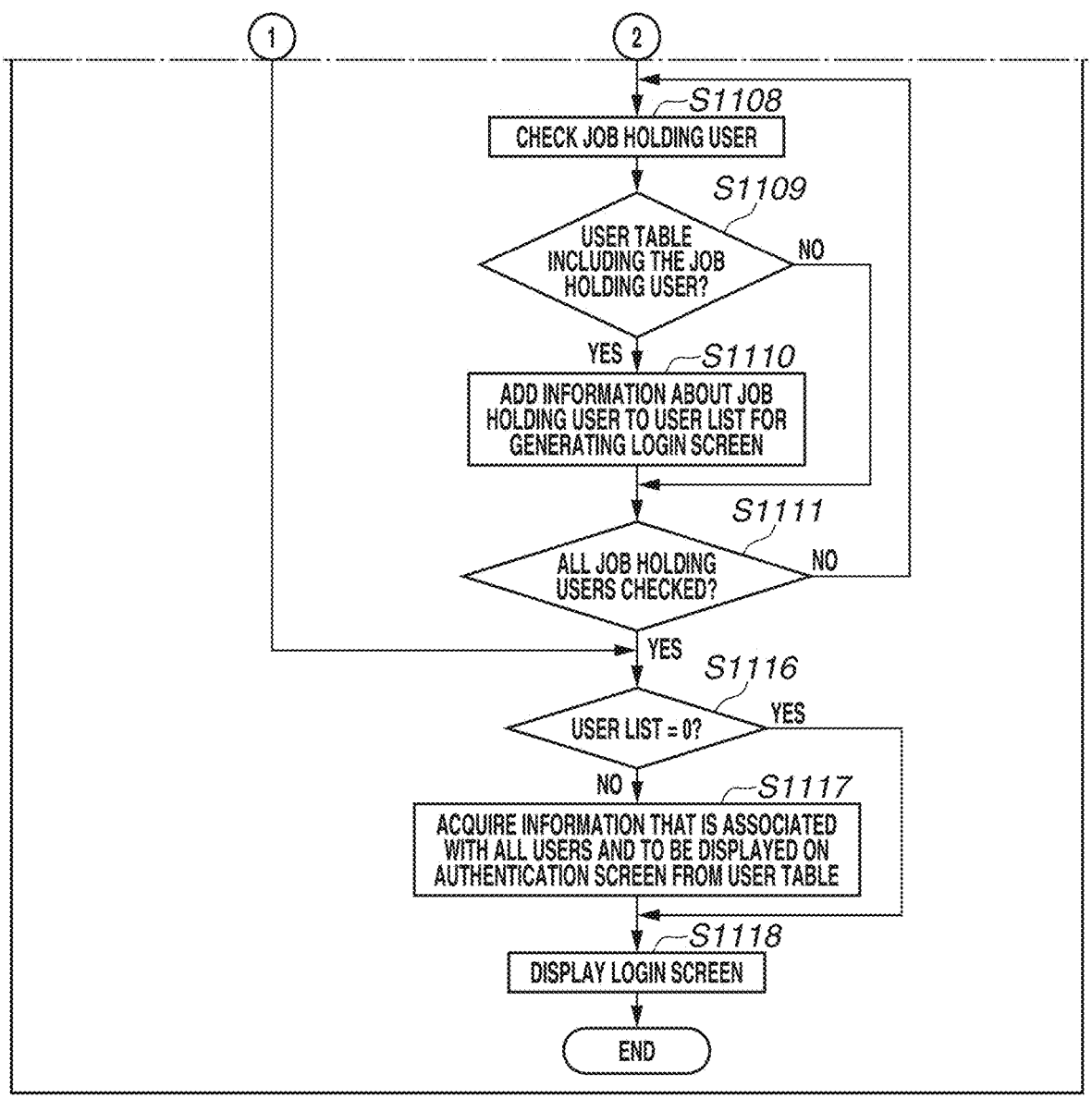
FIG. 11 (consisting of FIGS. 11A and 11B) is a flowchart illustrating processing in the MFP.

FIG. 11 is a flowchart illustrating processing executed by the login application 320 when the login application 320 displays the login screen 410 on the operation unit 208. A program for executing each step illustrated in the flowchart in FIG. 11 is stored in the ROM 203 or the HDD 204 and is executed by the CPU 201.

In step S1100, the login application 320 receives a display request for displaying the login screen. Then, in step S1101, the login application 320 determines whether the received display request is a request received after the personal print application 310 is selected on the application selection screen 600. For example, when the MFP 101 is operating in a normal mode, the login screen is displayed immediately after the MFP 101 is activated or logout of a user. Thus, in this case, the result of the determination in step S1101 is "NO". On the other hand, for example, the MFP 101 also operates in a mode in which the login screen is displayed when the application is selected ("function dependent authentication mode" described above) depending on the mode of the MFP 101. When the MFP 101 is operating in the function dependent authentication mode and the personal print application 310 is selected on the application selection screen 600, the result of the determination in step S1101 is "YES". In other words, when the result of the determination in step S1101 is "YES", the user is likely to use the MFP 101 to perform an operation of printing or deleting a document held in advance. For that reason, when the login screen is displayed, it is desirable to display only the document holding user icons or display user icons with giving high priority to the document holding user icons. Accordingly, in the present exemplary embodiment, in order for the login application 320 to acquire the document holding user list from the personal print application 310, the processing proceeds to step S1103. In addition, even when the MFP 101 is operating in the function dependent authentication mode, if an application (the copy application 301 or the transmission application 302) other than the personal print application 310 has been selected on the application selection screen 600, the result of the determination in step S1101 is "NO" and the processing proceeds to step S1102.

In step S1102, the login application 320 determines whether a display request for displaying the job holding user icons (and the user name) is to be issued. For example, the display request for displaying the job holding user icon(s) is issued when "print" is selected from the items of the user filter designation pull-down list 417. When the result of the determination in step S1102 is "YES", the processing proceeds to step S1103.

In step S1103, the login application 320 determines whether the callback function for acquiring the user list has been registered by the personal print application 310. In step S1103, when it is determined that the callback function for acquiring the user list has been registered by the personal print application 310 (YES in step S1103), the processing proceeds to step S1104. On the other hand, when it is determined that the callback function for acquiring the user list has not been registered by the personal print application 310 (NO in step S1103), the processing proceeds to step S1112.

In step S1104, the login application 320 transmits the acquisition request for the document holding user list by using the call back function registered in step S904. In step S1105, the personal print application 310 receives the user list acquisition request transmitted from the login application 320 in step S1104. In step S1106, the personal print application 310 transmits the document holding user list illustrated in FIG. 12 to the login application 320. The document holding user list, transmitted from the personal print application 310, is sorted in the order of receiving the print data.

In step S1107, the login application 320 acquires the document holding user list sorted in the order of receiving the print data transmitted from the personal print application 310.

In step S1108, the login application 320 extracts the document holding user in the document holding user list, acquired from the personal print application 310 in step S1107, one by one from the top of the list. Then, in step S1109, the login application 320 determines whether the document holding user has been registered in the user table in the user management unit 322.

For example, the document holding user is not registered in the user table when, for example, print data is stored in the HDD 204 by the personal print application 310 as a held document but the user account of the owner of the held document has been deleted by the login application 320.

In step S1109, when the login application 320 determines that the document holding user has been registered in the user table as a result of the processing in step S1008 (YES in step S1109), the processing proceeds to step S1110. In step S1110, the login application 320 adds the document holding user to the user list used for generating the login screen. The user list used for generating the login screen is a list of users to be displayed on the login screen. When a user is added to the user list, the icon image and the user name of this user are displayed in the processing in step S1118 (described below).

In step S1109, when the login application 320 determines that the document holding user has not been registered in the user table as a result of the processing in step S1008 (NO in step S1109), the processing for adding the information about the user to the user list used for generating the login screen is skipped and the processing proceeds to step S1111.

In step S1110, the login application 320 determines whether information about all the job holding users in the job holding user list acquired in step S1107 has been checked. When not all the information about the job holding users has been checked (NO in step S1110), the processing returns to step S1108, and the processing in steps S1109 and S1110 is executed for the next job holding user. On the other hand, when all information about the job holding users has been checked (YES in step S1110), the processing proceeds to step S1116.

In step S1116, the login application 320 determines whether there is no record in the user list used for generating the login screen. When it is determined that there is no record (YES in step S1116), the processing proceeds to step S1118. On the other hand, when it is determined that there are one or more records (NO in step S1116), the processing proceeds to step S1117.

In step S1117, the login application 320 acquires the user identification information associated with each user from the user table (FIG. 14). The identification information to be acquired includes the user name 1401 and the icon image 1406 illustrated in FIG. 14.

In step S1118, the login application 320 displays the login screen on the operation unit 208. When it is determined in step S1116 that the user list used for generating the login screen includes no record (YES in step S1116), the login screen with no user icon image is displayed. When it is determined in step S1116 that the user list used for generating the login screen includes one or more records (NO in step S1116), the login screen (see FIG. 4B or 4C) including the icon image and the user name acquired in step S1117 that correspond to the user is generated and displayed on the operation unit 208.

The processing in steps S1112 to S1115 is executed when a request for filtering or sorting the user icons to be displayed on the login screen has been issued. For example, such a request is issued by the user through the user filter designation pull-down list 417 or the sort pull-down list 418 on the login screen 410 in FIG. 4B or 4C.

In step S1112, the login application 320 determines whether a filter request or a sort request has been issued. When it is determined that the filter request has been issued ("filter" in step S1112), the processing proceeds to step S1113. In step S1113, the login application 320 filters information about the users registered in the user table based on a predetermined filter condition. Then in step S1115, the login application 320 adds the information about the user obtained after the filtering to the user list for generating the login screen. Various possible examples of the predetermined condition include whether a user has logged in within a predetermined time period, or whether a user having a user name includes a predetermined character string.

In step S1114, the login application 320 sorts the information about the users registered in the user table based on a predetermined sorting condition. Then, in step S1115, the login application 320 adds the information about user (s) obtained after the sorting to the user list used for generating the login screen. Various examples of the predetermined sorting condition include conditions using an order by name and an order of latest login date and times. Furthermore, a sorting condition of displaying a job holding user information with a priority over other users may be employed. This sort processing based on the job holding user information is executed based on the job holding user list acquired from the personal print application 310.

As described above, the printing apparatus according to the exemplary embodiment described above acquires the document holding user information from the personal print application 310 when displaying the login screen in the icon selection method. Then, the printing apparatus displays the login screen based on the acquired document holding user information. In other words, only the document holding user information among the user information registered in the user table can be displayed, the document holding user information can be displayed with high priority, or the user list can be displayed on the login screen based on the sorted order of the document holding user information.

Although not illustrated in FIG. 11, a user presses a corresponding user icon on the displayed login screen to log into the MFP 101. When the document list screen is displayed in a state where the user has logged in, only documents of the user is displayed in a list, so that the user can easily find his or her document.

The present invention can also be achieved by the process of supplying software (program) for implementing a function of an above exemplary embodiment to a system or an apparatus via a network or various storage media, and causing a computer (or a CPU or a microprocessor unit (MPU)) of the system or the apparatus to read and execute the program. In such a case, the program and the storage media storing the program configures the present invention.

With the present invention, a login application can display user identification information on a login screen based on document input user information acquired from a print application.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus capable of displaying a user selection screen for selecting a user to log in on a display, the printing apparatus capable of providing a plurality of functions including at least a function of using a printer and a function of using a scanner, at least a part of the plurality of functions being adjusted for the logged in user by the log in, the printing apparatus comprising:
one or more controllers configured to perform instructions to:
set a display mode of the user selection screen to one of a plurality of display modes including a first display mode and a second display mode;
cause the display to display, in the first display mode, the user selection screen on which, based on held print jobs, a plurality of user selection objects is arranged; and
cause the display to display, in the second display mode, the user selection screen on which, not based on the held print jobs, a plurality of user selection objects is arranged,
wherein, based on a selection of one user selection object, a login process for one user corresponding to the one user selection object is performed, regardless of whether the display mode when the one user selection object is selected is the first display mode or the second display mode.

2. The printing apparatus according to claim 1, wherein an operation object for setting the second display mode is arranged on the user selection screen in the first display mode.

3. The printing apparatus according to claim 2, wherein the operation object is a filter object as a pull-down list.

4. The printing apparatus according to claim 1, wherein an operation object for setting the first display mode is arranged on the user selection screen in the second display mode.

5. The printing apparatus according to claim 1,
wherein the user selection screen in the first display mode is a screen on which a user selection object of a user associated with the held print jobs is preferentially arranged, and
wherein the user selection screen in the second display mode is a screen on which the user selection object of the user associated with the held print jobs is not preferentially arranged.

6. The printing apparatus according to claim 1,
wherein the user selection screen in the first display mode is a screen on which only a user selection object of a user associated with the held print jobs is arranged, and
wherein the user selection screen in the second display mode is a screen on which any user selection object including the user selection object of the user associated with the held print jobs is arranged.

7. The printing apparatus according to claim 1, wherein the one or more controllers are further configured to perform instructions to:
cause the display to display, in the first display mode, the user selection screen on which, based on job held user information that contains user identification information associated with one of the held print jobs, a plurality of user selection objects is arranged; and
cause the display to display, in the second display mode, the user selection screen on which, not based on the job held user information, a plurality of user selection objects is arranged.

8. The printing apparatus according to claim 7, wherein the job held user information is managed by a predetermined print application.

9. The printing apparatus according to claim 1, wherein the one or more controllers are further configured to perform instructions to:
cause the display to display, in the second display mode, the user selection screen on which, based on registered user information that contains user identification registered by a predetermined process, a plurality of user selection objects is arranged.

10. The printing apparatus according to claim 9, wherein the predetermined process is a process of registering user identification information assigned to print data received from an external apparatus.

11. The printing apparatus according to claim 9, wherein the predetermined process is a process of registering manually input user identification information.

12. The printing apparatus according to claim 1,
wherein the user selection screen includes a first user selection object and a second user selection object in the second display mode, and
wherein the user selection screen includes the first user selection object but does not include the second user selection object in the first display mode.

13. The printing apparatus according to claim 10, wherein the one or more controllers are further configured to perform an instruction to:
perform a login process of a first user in response to selection of a first user selection object and perform a login process of a second user in response to selection of a second user selection object.

14. The printing apparatus according to claim 1, wherein the held print jobs are held by a forced holding function.

15. The printing apparatus according to claim 13, wherein in a case where the first user selection object is selected, an operation screen customized for the first user is displayed and in a case where the second user selection object is selected, an operation screen customized for the second user is displayed.

16. The printing apparatus according to claim 13, wherein the one or more controllers are further configured to perform instructions to:
cause, after at least the first user selection object for the first user is selected on the user selection screen, the display device to display a user job list screen on which only a print job associated with the first user is arranged.

17. The printing apparatus according to claim 16, further comprising an image forming device configured to form an image on a sheet,
wherein the one or more controllers are further configured to perform instructions to:
cause the image forming device, based on a print job selected from print jobs arranged on the user job list screen, to form an image based on the selected print job.

18. The printing apparatus according to claim 2, wherein at least one of a sort object as a pull-down list, a user registration button, and a user edit button is further arranged on the user selection screen in the first display mode.

19. The printing apparatus according to claim 10, wherein the one or more controllers are further configured to perform instructions to:
cause the display to display a function selection screen for allowing the logged in user to select one function from among the plurality of functions.

20. The printing apparatus according to claim 19, wherein the function selection screen includes an object for selecting a function to use the held print jobs associated with the logged in user.

21. A method for controlling a printing apparatus, the printing apparatus capable of providing a plurality of functions including at least a function of using a printer and a function of using a scanner, at least a part of the plurality of functions being adjusted for the logged in user by the log in, the method comprising:
setting a display mode of a user selection screen to one of a plurality of display modes including a first display mode and a second display mode;
causing a display to display, in the first display mode, the user selection screen on which, based on held print jobs, a plurality of user selection objects is arranged; and
causing the display to display, in the second display mode, the user selection screen on which, not based on the held print jobs, a plurality of user selection objects is arranged,
wherein, based on a selection of one user selection object, a login process for one user corresponding to the one user selection object is performed, regardless of whether the display mode when the one user selection object is selected is the first display mode or the second display mode.

22. A non-transitory computer-readable storage medium storing a computer-executable program for causing a computer to execute a method of controlling a printing apparatus, the printing apparatus capable of providing a plurality of functions including at least a function of using a printer and a function of using a scanner, at least a part of the plurality of functions being adjusted for the logged in user by the log in, the method comprising:
setting a display mode of a user selection screen to one of a plurality of display modes including a first display mode and a second display mode;
causing a display to display, in the first display mode, the user selection screen on which, based on held print jobs, a plurality of user selection objects is arranged; and
causing the display to display, in the second display mode, the user selection screen on which, not based on the held print jobs, a plurality of user selection objects is arranged,
wherein, based on a selection of one user selection object, a login process for one user corresponding to the one user selection object is performed, regardless of whether the display mode when the one user selection object is selected is in the first display mode or the second display mode.

* * * * *